US012640449B2

(12) United States Patent
Okutani

(10) Patent No.: US 12,640,449 B2
(45) Date of Patent: May 26, 2026

(54) SEALED BATTERY

(71) Applicant: SANYO Electric Co., Ltd., Osaka (JP)

(72) Inventor: Oose Okutani, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 508 days.

(21) Appl. No.: 17/910,110

(22) PCT Filed: Mar. 12, 2021

(86) PCT No.: PCT/JP2021/009989
§ 371 (c)(1),
(2) Date: Sep. 8, 2022

(87) PCT Pub. No.: WO2021/187349
PCT Pub. Date: Sep. 23, 2021

(65) Prior Publication Data
US 2023/0095106 A1 Mar. 30, 2023

(30) Foreign Application Priority Data
Mar. 19, 2020 (JP) ................................. 2020-048656

(51) Int. Cl.
*H01M 50/566* (2021.01)
*H01M 50/107* (2021.01)
*H01M 50/186* (2021.01)

(52) U.S. Cl.
CPC ....... *H01M 50/566* (2021.01); *H01M 50/107* (2021.01); *H01M 50/186* (2021.01)

(58) Field of Classification Search
CPC . H01M 50/566; H01M 50/107; H01M 50/186
See application file for complete search history.

(56) References Cited

U.S. PATENT DOCUMENTS

2010/0247992 A1* 9/2010 Miyata ................. B23K 26/206
29/623.2

FOREIGN PATENT DOCUMENTS

JP 2003151527 A * 5/2003
JP 2005-340005 A 12/2005
(Continued)

OTHER PUBLICATIONS

JP-2003151527-A Machine Translation.*
(Continued)

*Primary Examiner* — Miriam Stagg
*Assistant Examiner* — Quintin D. Elliott
(74) *Attorney, Agent, or Firm* — WHDA, LLP

(57) ABSTRACT

The purpose of the present disclosure is to provide a sealed battery that can expand a joint area of an electrode lead with respect to a sealing body or the like without using a large-width electrode lead. A sealed battery, which is an example of an embodiment, comprises: an electrode body having an electrode lead; a bottomed tubular exterior can that accommodates the electrode body; and a sealing body that plugs an opening section of the exterior can. The electrode lead is welded, with energy beams, to the inner surface of the sealing body. In addition, the electrode lead includes: a first main surface making contact with the inner surface of the sealing body; and a second main surface on the opposite side of the first main surface, wherein the first main surface and the second main surface are formed in no-parallel with each other.

3 Claims, 4 Drawing Sheets

(56)  References Cited

FOREIGN PATENT DOCUMENTS

| JP | 2007-234276 A |   | 9/2007 |
|----|---------------|---|--------|
| JP | 2019023975 A  | * | 2/2019 |

OTHER PUBLICATIONS

JP-2019023975-A Machine Translation.*
International Search Report dated May 18, 2021, issued in counterpart Application No. PCT/JP2021/009989, with English Translation. (6 pagers).
Written Opinion dated May 18, 2021, issued in counterpart Application No. PCT/JP2021/00998. (3 pagers).

* cited by examiner

SEALED BATTERY

CROSS-REFERENCE TO RELATED APPLICATION

This application is a National Phase Application filed under 35 U.S.C. § 371 of International Application No. PCT/JP2021/009989 filed on Mar. 12, 2021 which claims the benefit of priorities under 35 U.S.C. § 119 (a) of Japanese Patent Application No. 2020-048656 filed in Japan on Mar. 19, 2020, the contents of which are incorporated herein by reference.

TECHNICAL FIELD

The present disclosure relates to sealed batteries, in particular to a sealed battery with an electrode lead welded to at least one of an inner face of a sealing assembly and an inner face of an outer can.

BACKGROUND ART

Widely-known sealed batteries include an electrode assembly with electrode leads, a cylindrical outer can with a closed bottom for enclosing the electrode assembly, and a sealing assembly which closes an opening of the outer can. The electrode lead includes a positive electrode lead connected to a positive electrode, and a negative electrode lead connected to a negative electrode. For example, in a cylindrical battery, the positive electrode lead is connected to an inner face of the sealing assembly, while the negative electrode lead is connected to an inner face of the outer can. Patent Literature 1 discloses a sealed battery with an electrode lead which is laser welded to an inner face of a sealing assembly.

CITATION LIST

Patent Literature

PATENT LITERATURE 1: JP 2007-234276 A

SUMMARY

Problems to be Solved by the Invention

A joint of an electrode lead to a sealing assembly or other element is desired to be secure in order to prevent the electrode lead from peeling off due to vibrations or impact. A joint area of a certain size is required not only to ensure a joint force but also to reduce resistive heating.

In order to ensure a sufficient joint area of an electrode lead to a sealing assembly or other portions, the electrode lead having a larger width may be used. However, this can cause an issue that the energy density of the battery is lowered. Furthermore, as the electrode leads are highly rigid and not easily deformable, wide electrode leads may lead to distortion or misalignment of the electrode assembly, in particular in a cylindrical battery with a wound-type electrode assembly, lowering the performance of the battery.

Means for Solving the Problems

A sealed battery according to an aspect of the present disclosure includes an electrode assembly, an outer can, and a sealing assembly. The electrode assembly includes an electrode lead. The outer can encloses the electrode assembly and has a cylindrical shape with a closed bottom. The sealing assembly closes an opening of the outer can. The electrode lead is connected by energy beam welding to at least one of an inner face of the sealing assembly and an inner face of the outer can. The electrode lead includes a first face in contact with the inner face of the sealing assembly or the inner face of the outer can, and a second face on the other side opposite from the first face. The first face and the second face are arranged in non-parallel to each other.

Advantages of the Invention

The present disclosure according to one aspect can provide a sealed battery with a large joint area of the electrode lead to a sealing assembly or other elements without using a wide electrode lead.

DESCRIPTION OF EMBODIMENTS

An embodiment of the present disclosure is described below. Although a cylindrical battery in which a wound-type electrode assembly 14 is encased in a cylindrical outer can 16 with a closed bottom is described as a sealed battery according to an embodiment of the present disclosure, the battery may be a prismatic type with a rectangular outer can. The electrode assembly may be a stacked type with multiple positive electrodes and negative electrodes which are alternately stacked via separators. In the present specification, in order to facilitate description, the side at which a sealing assembly 17 is located is deemed as "top", and the other side at which the bottom of the outer can 16 is located as "bottom".

Figure 1:
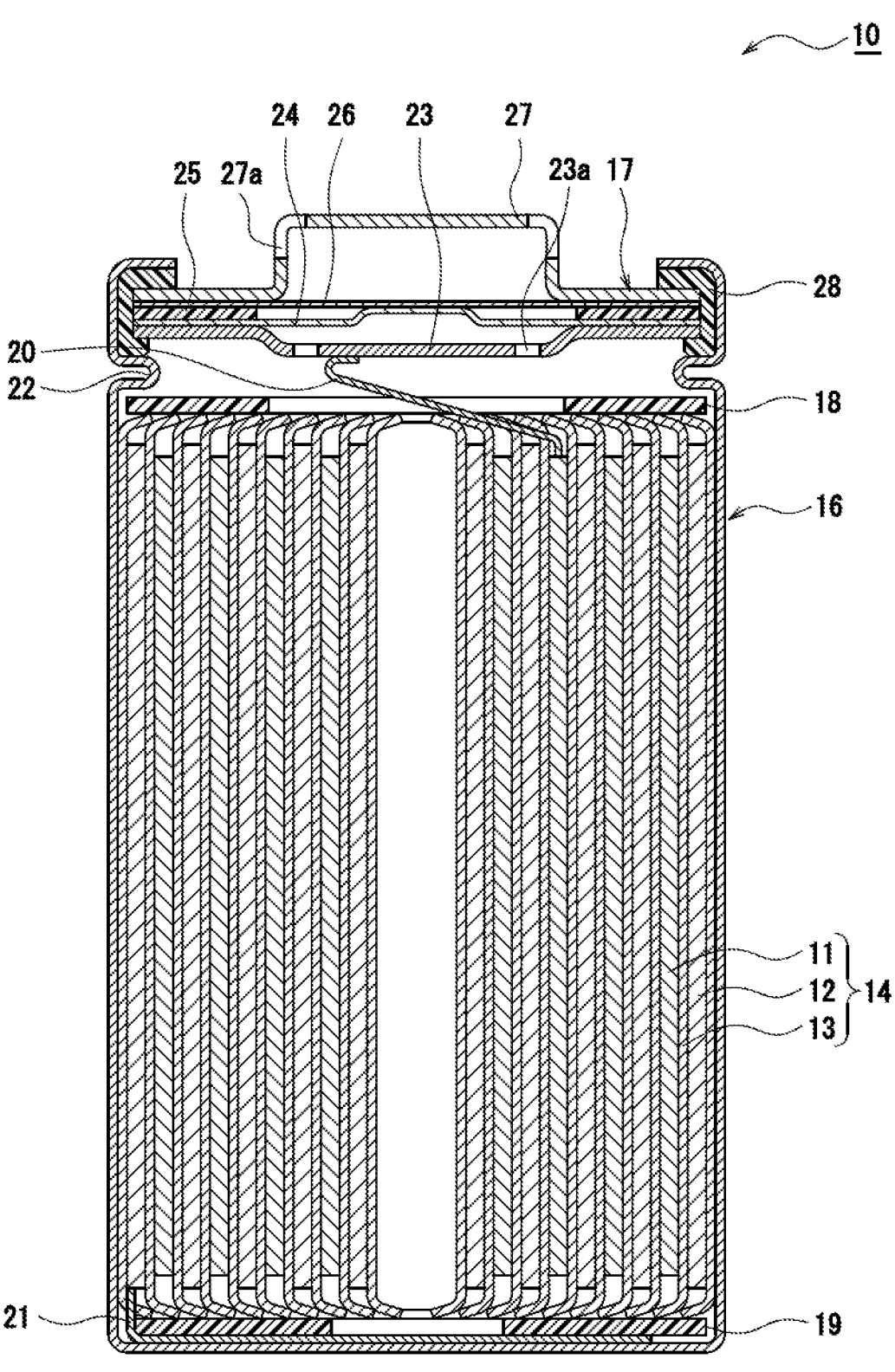
FIG. 1 is a cross-sectional view of a sealed battery according to an embodiment of the present disclosure.

FIG. 1 shows a cross-sectional view of a sealed battery 10 according to an embodiment of the present disclosure. As shown in FIG. 1, the sealed battery 10 includes the electrode assembly 14, the cylindrical outer can 16 with a closed bottom which houses the electrode assembly 14, and the sealing assembly 17 which closes an opening of the outer can 16. The outer can 16 also contains electrolyte. The electrode assembly 14 includes a positive electrode 11, a negative electrode 12, and a separator 13 sandwiched between the positive electrode 11 and the negative electrode 12, and a positive electrode lead 20 and a negative electrode lead 21 as electrode leads. Typically, each electrode lead is formed from a metal strip thicker than an electrode core. The electrode assembly 14 has a wound configuration in which the positive electrode 11 and the negative electrode 12 are wound via the separator 13.

The electrolyte may be aqueous or non-aqueous. The sealed battery 10 may be, for example, a non-aqueous electrolyte secondary battery, such as a lithium ion battery, which contains non-aqueous electrolyte. The non-aqueous electrolyte may contain, for example, non-aqueous solvent and electrolyte salt dissolved in the non-aqueous solvent. The non-aqueous solvent may be, for example, esters, ethers, nitriles, amides, or a mixture of two or more of these groups. The non-aqueous solvent may contain a halogen substituent in which hydrogen in the solvent is at least partially replaced by halogen atoms, such as fluorine. The non-aqueous electrolyte is not limited to a liquid electrolyte, and may be a solid electrolyte. A lithium salt, such as $LiPF_6$, may be used as the electrolyte salt.

The electrode assembly 14 may include the long-strip positive electrode 11, the long-strip negative electrode 12, the two long-strip separators 13, the positive electrode lead 20 connected to the positive electrode 11, and the negative electrode lead 21 connected to the negative electrode 12. In order to reduce lithium deposition, the negative electrode 12 may be formed to be slightly larger than the positive electrode 11. Specifically, the negative electrode 12 may be longer than the positive electrode 11 both in length and width (along the vertical direction). The two separators 13 may also be formed to be slightly larger than the positive electrode 11. The separators 13 may be disposed, for example, to sandwich the positive electrode 11.

The positive electrode 11 may include a positive electrode core and a positive electrode mixture layer disposed on each side of the positive electrode core. The positive electrode core may be made from a foil of metal, such as aluminum or an aluminum alloy, that is stable within a potential range of the positive electrode 11, or a film which includes the metal at the outermost layers. The positive electrode mixture layer may include a positive electrode active material, a conductive agent such as acetylene black, and a binder such as polyvinylidene fluoride (PVDF). The positive electrode 11 may be manufactured by forming the positive electrode mixture layer on each side of the positive electrode core by coating the positive electrode core with a positive electrode mixture slurry including the positive electrode active material, the conductive agent, and the binder, and drying and compressing the coated film.

The positive electrode active material may be, for example, a lithium transition metal composite oxide. The lithium transition metal composite oxide may contain the following metallic elements: Ni, Co, Mn, Al, B, Mg, Ti, V, Cr, Fe, Cu, Zn, Ga, Sr, Zr, Nb, In, Sn, Ta, and W. A preferable lithium transition metal composite oxide may be a lithium metal composite oxide which contains at least one of Ni, Co, and Mn. Examples include a composite oxide containing Ni, Co, and Mn, and a composite oxide containing Ni, Co, and Al.

The negative electrode 12 may include a negative electrode core and a negative electrode mixture layer disposed on each side of the negative electrode core. The negative electrode core may be made from a foil of metal, such as copper or a copper alloy, that is stable within a potential range of the negative electrode 12, or a film which includes the metal at the outermost layers. The negative electrode mixture layer may include a negative electrode active material, and a binder such as styrene-butadiene rubber (SBR). The negative electrode 12 may be manufactured by forming the negative electrode mixture layer on each side of the negative electrode core by coating the negative electrode core with a negative electrode mixture slurry including the negative electrode active material and the binder, and drying and compressing the coated film.

The negative electrode active material may be a carbon-based active material, such as natural graphite (for example, fish-scale-shaped graphite, lump graphite, and earthy graphite) or artificial graphite (for example, lump artificial graphite and graphitized mesophase carbon microbeads). The negative electrode active material may be a metal (such as Si, and Sn) which can make an alloy with lithium, or an alloy or compound containing such a metal. These materials may be used with a carbon-based active material.

Insulation plates 18, 19 are respectively disposed over and under the electrode assembly 14. In the embodiment shown in FIG. 1, the positive electrode lead 20 connected to the positive electrode 11 extends toward the sealing assembly 17 through a through-hole of the insulation plate 18. The negative electrode lead 21 connected to the negative electrode 12 extends toward the bottom of the outer can 16 passing outside the edge of the insulation plate 19. The positive electrode lead 20 is welded to an inner face of the sealing assembly 17 facing inside the battery. The sealing assembly 17 acts as a positive electrode external terminal. The negative electrode lead 21 is welded to a bottom inner face of the outer can 16. The outer can 16 acts as a negative electrode external terminal. The negative electrode lead 21 may be connected to the inner face of the sealing assembly 17. In this case, the sealing assembly 17 acts as the negative electrode external terminal.

The outer can 16 may be, for example, a cylindrical metal container with a closed bottom. A resin gasket 28 may be disposed between the outer can 16 and the sealing assembly 17. The gasket 28 closes space between the outer can 16 and the sealing assembly 17 to seal the battery. The outer can 16 may have a grooved portion 22 which supports the sealing assembly 17. The grooved portion 22 may be formed at a lateral wall of the outer can 16 by applying a spinning process from the outer side of the lateral wall. The grooved portion 22 may be formed in a ring-shape around the circumference of the outer can 16 to support the sealing assembly 17 on the upper edge of the grooved portion 22. An upper edge of the outer can 16 may be bend towards the inner side of the outer can 16 and swaged around the circumferential edge of the sealing assembly 17.

The sealing assembly 17 may include an internal terminal plate 23, a lower vent member 24, an insulating member 25, an upper vent member 26, and a cap 27 stacked in this order from the electrode assembly 14 side. Each of these components of the sealing assembly 17 has, for example, a disc or ring shape, and all the components except for the insulating member 25 are electrically connected to each other. The lower vent member 24 and the upper vent member 26 are attached to each other around the center of the valves with the insulating member 25 sandwiched between the two around the circumferential edges. In the event of an increase in the inner pressure of the battery due to overheat, the lower vent member 24 may be deformed to push the upper vent member 26 towards the cap 27 and broken, disconnecting the electrical path between the lower vent member 24 and the upper vent member 26. When the inner pressure increases further, the upper vent member 26 may also be broken, releasing gas through an opening 27a of the cap 27.

Although the positive electrode lead 20 is welded to a core exposed portion of the positive electrode 11 formed at a location corresponding to the negative electrode 12 and the positive electrode lead 20 is inserted into the electrode assembly 14 in the present embodiment, a part of the positive electrode core may be configured to protrude upward to form a positive electrode tab and the positive electrode lead 20 may be welded to this positive electrode tab.

Figure 2:
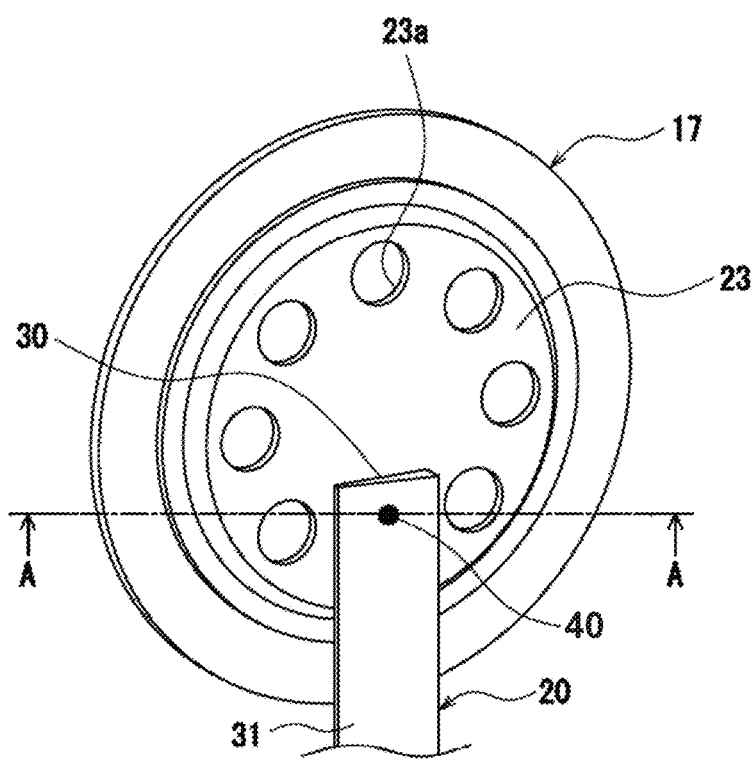
FIG. 2 is a perspective view of a sealing assembly and an electrode lead according to an embodiment of the present disclosure.
Figure 3:
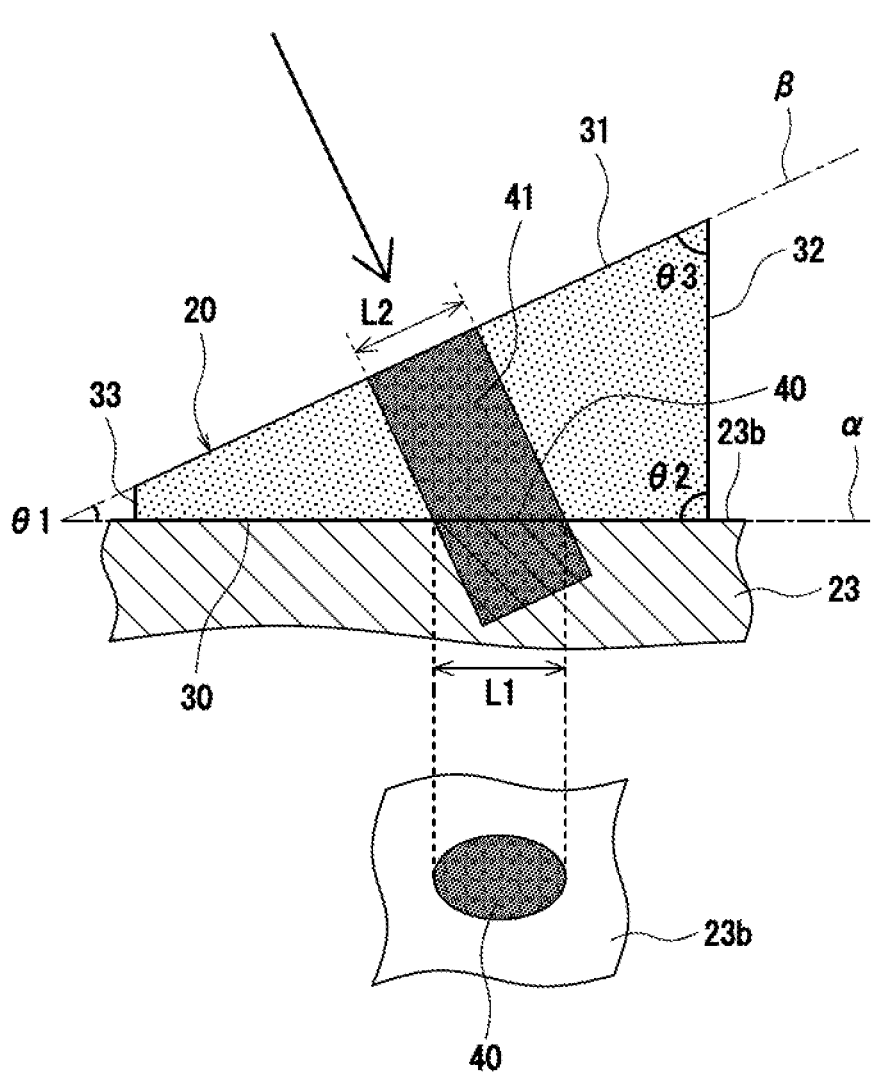
FIG. 3 is a partial cross-sectional view taken along line A-A in FIG. 2.

With reference to FIGS. 2 and 3, a structure of the positive electrode lead 20 and a connection of the positive electrode lead 20 to the sealing assembly 17 are described below. FIG. 2 is a perspective diagram showing the sealing assembly 17 and the positive electrode lead 20. FIG. 3 is a partial cross-sectional view taken along line A-A in FIG. 2. FIG. 3 also includes a bottom view of a bottom face 23*b* of the sealing assembly 17, showing a welded portion 40.

As shown in FIGS. 2 and 3, the positive electrode lead 20 is welded to the bottom face 23*b* of the internal terminal plate 23 which is the element of the sealing assembly 17 positioned most inside the battery. The positive electrode lead 20 has a first face 30 in contact with the bottom face 23*b* of the internal terminal plate 23, a second face 31 on the other side opposite from the first face 30, and edges 32, 33 along the thickness of the lead. The welded portion 40 joining the first face 30 and the bottom face 23*b* is at least partially formed in a contact area between the first face 30 and the bottom face 23*b*. Multiple openings 23*a* are formed in the internal terminal plate 23. The welded portion 40 is formed avoiding the openings 23*a*.

The positive electrode lead 20 is formed from a metal strip. While the metal that can be used for the positive electrode lead 20 is not limited to a particular metal, for example, aluminum may be used. The positive electrode lead 20 may have a constant width for the entire length. The upper end of the positive electrode lead 20 extending over the upper edge of the positive electrode 11 is bent along the bottom face 23*b* of the internal terminal plate 23 (refer to FIG. 1). The internal terminal plate 23 is formed using a metal disc with the openings 23*a*. While the metal that can be used for the internal terminal plate 23 is not limited to a particular metal, for example, aluminum may be used. The area of the bottom face 23*b* to which the positive electrode lead 20 is welded is flat.

The positive electrode lead 20 may be connected by energy beam welding to the bottom face 23*b* of the internal terminal plate 23. In the energy beam welding, with the positive electrode lead 20 disposed on the bottom face 23*b* of the internal terminal plate 23, an energy beam is applied from the second face 31 side of the positive electrode lead 20 to melt and join the positive electrode lead 20 and the internal terminal plate 23. A melted mark 41 in which the metal is once melted and solidified is left on the positive electrode lead 20 and the internal terminal plate 23. The welded portion 40 is a joint portion of the first face 30 and the bottom face 23*b*, and is a part of the melted mark 41.

The energy beam applied to form the welded portion 40 may be laser, electron, or other beams. In particular, a laser beam is preferable. While the type of the laser beam is not limited to a particular type as long as the laser beam can weld the positive electrode lead 20, for example, YAG laser, $CO_2$ laser, $YVO_4$ laser, or semiconductor (LD) laser may be used. When applied, the laser beam must be substantially perpendicular to the second face 31 of the positive electrode lead 20. An oblique incident of the laser beam to the second face 31 increases an energy loss due to an increase in the laser beam reflected off the second face 31, making it difficult to from the welded portion 40. In the description below, the laser beam is assumed to be used as the energy beam.

In the positive electrode lead 20, the first face 30 and the second face 31 are arranged in non-parallel to each other. The lateral cross-sectional view of the positive electrode lead 20 shown in FIG. 3 has a rectangular shape which is very close to a triangle. The length of the edge 33 is significantly larger than that of the edge 32. The edges 32, 33 are arranged in parallel to each other and in perpendicular to the first face 30, and disposed in perpendicular to the bottom face 23*b* of the internal terminal plate 23.

In the lateral cross-sectional view of the positive electrode lead 20, a virtual line along the first face 30 is represented by α, whereas a virtual line along the second face 31 is represented by β. The virtual lines α and β are oriented in non-parallel to each other, and cross each other ahead of the shorter edge 33. In the embodiment shown in FIG. 3, the second face 31 is entirely arranged in non-parallel to the first face 30. The second face 31 is entirely sloped with respect to the bottom face 23*b* of the internal terminal plate 23 with which the first face 30 is in contact.

As described above, the positive electrode lead 20 is laser welded to the bottom face 23*b* of the internal terminal plate 23. In this process, the laser beam must be applied to the second face 31 in substantially perpendicular in order to reduce reflection of the laser beam. Because the first face 30 and the second face 31 of the positive electrode lead 20 are arranged in non-parallel to each other, the laser beam applied in perpendicular to the second face 31 enters oblique to the contact area between the first face 30 and the bottom face 23*b*. With this oblique incident laser beam, the welded portion 40 can have a larger area than with a conventional electrode lead having the first and second faces arranged in parallel to each other.

In the present embodiment, a length L1 of the melted mark 41 (that is, the welded portion 40) formed on the bottom face 23*b* of the internal terminal plate 23 along the virtual line α is longer than a length L2 of the melted mark 41 formed on the second face 31 of the positive electrode lead 20 along the virtual line β. With a conventional electrode lead, the lengths L1 and L2 are substantially the same. In the present embodiment, the oblique incident of the laser beam to the contact area between the first face 30 and the bottom face 23*b* forms the welded portion 40 larger than with the conventional electrode lead.

The shape of the spot radiated with the laser beam on the second face 31 of the positive electrode lead 20 (that is, the shape of the melted mark 41) is not limited to a particular shape. The shape may be, for example, circular (refer to FIG. 2) or oval elongated along the width of the positive electrode lead 20. For example, by applying the laser beam over the positive electrode lead 20 along the width, the welded portion 40 elongated along the width can be formed. In general, a larger application area of the laser beam forms the welded portion 40 having a larger area. With the same laser spot size on the second face 31, the welded portion 40 becomes larger when using the positive electrode lead 20 than when using a conventional electrode lead.

Although an angle θ1 in the lateral cross-sectional view of the positive electrode lead 20 formed between the virtual line α along the first face 30 and the virtual line β along the second face 31 (that is, a slope angle of the second face 31 with respect to the bottom face 23*b* of the internal terminal plate 23) is not limited to a particular angle, the angle may preferably be 5° or larger, and more preferably 10° or larger. The larger the angle θ1, the larger the length ratio of the length L1 to the length L2 described above.

The upper limit of the angle θ1 may be, for example, 45°. For the wound-type electrode assembly 14, too large angle θ1 may lead to distortion or misalignment of the electrode assembly 14. The positive electrode lead 20 may be formed such that while the first face 30 and the second face 31 are arranged in parallel at the end connected to the positive electrode 11 of the positive electrode lead 20, the first face 30 and the second face 31 are arranged in non-parallel at the other end welded to the internal terminal plate 23. In this case, the above issue will not occur even with the large angle θ1. The first face 30 and the second face 31 may be arranged in non-parallel to each other by attaching a discrete metal component only to the end portion of the positive electrode lead 20.

A preferable range of the angle θ1 is, for example, 1° to 45°, and more preferably, 5° to 45°, 5° to 30°, or 10° to 30°. In the embodiment shown in FIG. 3, an angle θ2 formed between the first face 30 (virtual line α) and the edge 32 is about 90°. In the lateral cross-sectional view, the shape of the positive electrode lead 20 is substantially triangle. When the angle θ2 is a right angle, an angle θ3 formed between the second face 31 (virtual line β) and the edge 32 may be 45° to 89°, preferably, 45° to 75°, 50° to 75°, or 50° to 70°.

The ratio of the maximum thickness T2 of the positive electrode lead 20 to the minimum thickness T1 (T2/T1) may be 0<T2/T1≤100. In the embodiment shown in FIG. 3, the ratio of the length of the edge 32 to the length of the edge 33 is equal to T2/T1. The maximum thickness T2 of the positive electrode lead 20 is, for example, 1 mm, preferably 0.7 mm, or more preferably 0.5 mm in order to increase the energy density of the battery. The minimum thickness T1 of the positive electrode lead 20 is, for example, 0.01 mm, preferably 0.05 mm or more, or more preferably 0.1 mm or more in order to reduce resistor heating and ensure strength.

Figure 4:
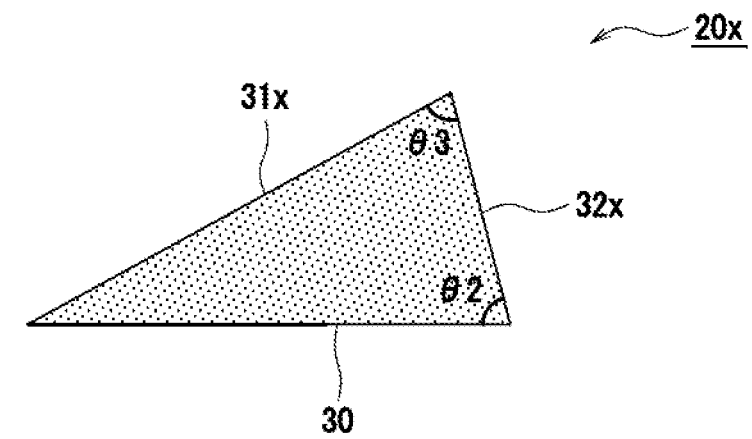
FIG. 4 is a lateral cross-sectional view of an electrode lead according to another embodiment of the present disclosure.
Figure 5:
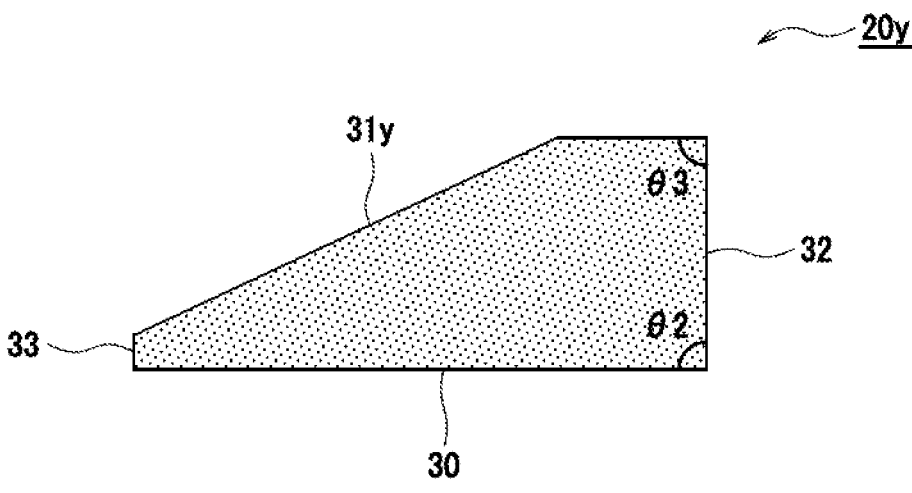
FIG. 5 is a lateral cross-sectional view of an electrode lead according to yet another embodiment of the present disclosure.

FIGS. 4 and 5 are lateral cross-sectional views of positive electrode leads 20x, 20y according to other embodiments of the present disclosure. In the description below, the same reference numerals are assigned to the elements same as those in the above embodiment, and their descriptions are omitted to avoid redundancy. In the positive electrode lead 20 shown in FIG. 3, the first face 30 and the edge 32 meet at a right angle, and the angles θ2 and θ3 differ from each other. In the positive electrode lead 20x shown in FIG. 4, the first face 30 and an edge 32x are not arranged in perpendicular to each other, and the angles θ2 and θ3 are substantially equal to each other. In the positive electrode lead 20x, the first face 30 and a second face 31x substantially meat, and the lateral cross section has a shape of substantial isosceles triangle. Also in this case, the angle θ1 formed between the virtual line α along the first face 30 and the virtual line β along the second face 31x is, for example, 1° to 45°, and more preferably, 5° to 45°, 5° to 30°, or 10° to 30°.

As shown in FIG. 5, a second face 31y may include a slope portion in non-parallel to the first face 30, and a parallel portion in parallel to the first face 30. It is preferable that the slope portion has a larger area than the parallel portion. In the positive electrode lead 20y shown in FIG. 5, the angles θ2 and θ3 are substantially the same. In the lateral cross-sectional view, the shape of the positive electrode lead 20y is a pentagon. Also in this case, the angle θ1 formed between the virtual line α along the first face 30 and the virtual line 13 along the slope portion of the second face 31y is, for example, 1° to 45°, and more preferably, 5° to 45°, 5° to 30°, or 10° to 30°.

As described above, use of the positive electrode lead 20, 20x, 20y having the above described structures can provide a joint area of the positive electrode lead 20 to the internal terminal plate 23 larger than that with a conventional electrode lead in which the first and the second faces are arranged in parallel to each other.

In addition to or in place of the positive electrode lead 20, the above described features of the positive electrode lead 20 may be applied to the negative electrode lead 21 by forming the first face and the second face in non-parallel to each other.

REFERENCE SIGNS LIST

10 sealed battery, 11 positive electrode, 12 negative electrode, 13 separator, 14 electrode assembly, 16 outer can, 17 sealing assembly, 18, 19 insulation plates, 20 positive electrode lead, 21 negative electrode lead, 22 grooved portion, 23 internal terminal plate, 23a, 27a openings, 23b bottom face, 24 lower vent member, 25 insulating member, 26 upper vent member, 27 cap, 28 gasket, 30 first face, 31 second face, 32, 33 edges, 40 welded portion, 41 melted mark, α, β virtual lines, and θ1, θ2, θ3 angle.

The invention claimed is:

1. A method of manufacturing a sealed battery comprising:

an electrode assembly comprising an electrode lead;

an outer can enclosing the electrode assembly, the outer can having a cylindrical shape with a closed bottom; and a sealing assembly closing an opening of the outer can, wherein the electrode lead is connected by energy beam welding to at least one of an inner face of the sealing assembly and an inner face of the outer can, the electrode lead comprises a first face in contact with the inner face of the sealing assembly or the inner face of the outer can, a second face on the other side opposite from the first face, the electrode lead having a length direction longer than a width direction and when viewed in the cross-section in regards to the first face and the second face are arranged in non-parallel to each other along the width direction of the electrode lead, and the energy beam welding is performed by applying an energy beam substantially perpendicular to the second face.

2. The manufacturing method of a sealed battery according to claim 1, wherein in a lateral cross-sectional view of the electrode lead, an angle θ formed between a virtual line α along the first face and a virtual line β along the second face is 1° to 45°.

3. The manufacturing method of a sealed battery according to claim 1, wherein the ratio of a maximum thickness T2 of the electrode lead to a minimum thickness T1 (T2/T1) is 0<T2/T1≤100.

* * * * *